(12) United States Patent
Akiyama et al.

(10) Patent No.: US 10,569,511 B2
(45) Date of Patent: Feb. 25, 2020

(54) DELAMINATION CONTAINER

(71) Applicants: Yoshio Akiyama, Tokyo (JP); Masakazu Kudo, Tokyo (JP); Shintaro Kutsuzawa, Tokyo (JP)

(72) Inventors: Yoshio Akiyama, Tokyo (JP); Masakazu Kudo, Tokyo (JP); Shintaro Kutsuzawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 55 days.

(21) Appl. No.: 15/508,077

(22) PCT Filed: Aug. 6, 2015

(86) PCT No.: PCT/JP2015/003970
§ 371 (c)(1),
(2) Date: Mar. 1, 2017

(87) PCT Pub. No.: WO2016/051641
PCT Pub. Date: Apr. 7, 2016

(65) Prior Publication Data
US 2017/0305122 A1    Oct. 26, 2017

(30) Foreign Application Priority Data
Sep. 30, 2014    (JP) ................. 2014-201627

(51) Int. Cl.
*B65D 1/40* (2006.01)
*B32B 27/06* (2006.01)
(Continued)

(52) U.S. Cl.
CPC .............. *B32B 27/06* (2013.01); *B29C 49/04* (2013.01); *B65D 1/0215* (2013.01); *B65D 47/06* (2013.01); *B32B 2307/70* (2013.01); *B65D 23/02* (2013.01)

(58) Field of Classification Search
CPC . B29B 11/14; B29C 45/1603; B29C 45/1646; B32B 27/08; B32B 27/306; B32B 27/32
(Continued)

(56) References Cited

U.S. PATENT DOCUMENTS 6,670,007 B1    12/2003  Safian et al.
9,511,892 B2 *  12/2016  Hosokoshiyama ..... B32B 27/32

FOREIGN PATENT DOCUMENTS

CN    101547836 A    9/2009
CN    104755250 A    7/2015
(Continued)

OTHER PUBLICATIONS

Apr. 4, 2017 International Preliminary Report on Patentability issued in International Patent Application No. PCT/JP2015/003970.
(Continued)

*Primary Examiner* — Ellen S Wood
(74) *Attorney, Agent, or Firm* — Oliff PLC

(57) ABSTRACT

A delamination container (1) formed in a shape including a tubular mouth (1a) and a trunk (1b), the container (1) including: an outer layer body (2) formed of a resin material; an inner layer body (3) formed of a resin material and disposed on an inner side of the outer layer body (2); and an intermediate layer (4) formed of a resin material different from those forming the outer and inner layer bodies (2) and (3) and disposed between the outer and inner layer bodies (2) and (3). The outer and inner layer bodies (2) and (3) and the intermediate layer (4) are formed by direct-blow molding a laminated parison including resin layers corresponding to them. At an opening end of the mouth (1a), an end portion of the intermediate layer (4) is covered by the outer and inner layer bodies (2) and (3).

6 Claims, 2 Drawing Sheets

(51) Int. Cl.
*B29C 49/04* (2006.01)
*B65D 1/02* (2006.01)
*B65D 47/06* (2006.01)
*B65D 23/02* (2006.01)

(58) Field of Classification Search
USPC .................. 215/12.2, 44; 428/34.1, 35.7
See application file for complete search history.

(56) References Cited

FOREIGN PATENT DOCUMENTS

| | | |
|---|---|---|
| JP | H08-133322 A | 5/1996 |
| JP | H08-156078 A | 6/1996 |
| JP | 2007-320644 A | 12/2007 |
| JP | 2009-007060 A | 1/2009 |
| JP | 2009-179403 A | 8/2009 |
| JP | 2011-136704 A | 7/2011 |
| WO | 2014/069116 A1 | 5/2014 |

OTHER PUBLICATIONS

Oct. 19, 2017 Office Action issued in Australian Patent Application No. 2015326365.
Oct. 20, 2015 International Search Report issued in International Patent Application No. PCT/JP2015/003970.
Nov. 28, 2017 Office Action issued in Chinese Patent Application No. 201580050186.4.
Mar. 4, 2019 Office Action issued in Canadian Patent Application No. 2,962,723.
Mar. 28, 2018 Office Action issued in Canadian Patent Application No. 2,962,723.
Jan. 16, 2018 Office Action issued in Japanese Patent Application No. 2014-201627.
Feb. 14, 2018 Office Action issued in Korean Patent Application No. 10-2017-7005910.
Mar. 12, 2018 Extended European Search Report issued in European Patent Application No. 15847761.2.
May 3, 2018 Office Action issued in Chinese Patent Application No. 201580050186.4.
May 8, 2018 Office Action issued in Japanese Patent Application No. 2014-201627.
Jul. 23, 2018 Office Action issued in Korean Patent Application No. 10-2017-7005910.
Sep. 19, 2018 Office Action issued in Canadian Patent Application No. 2,962,723.

\* cited by examiner

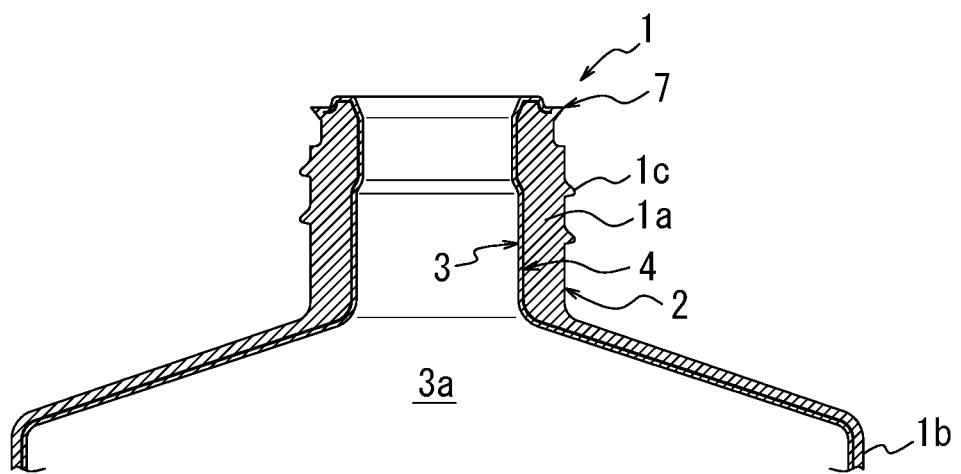
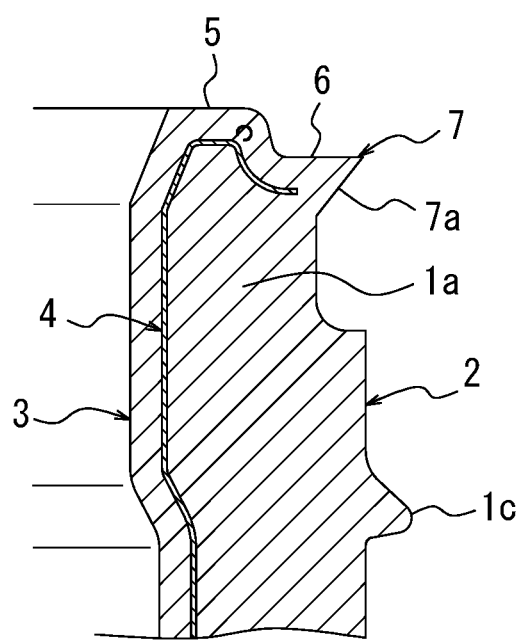

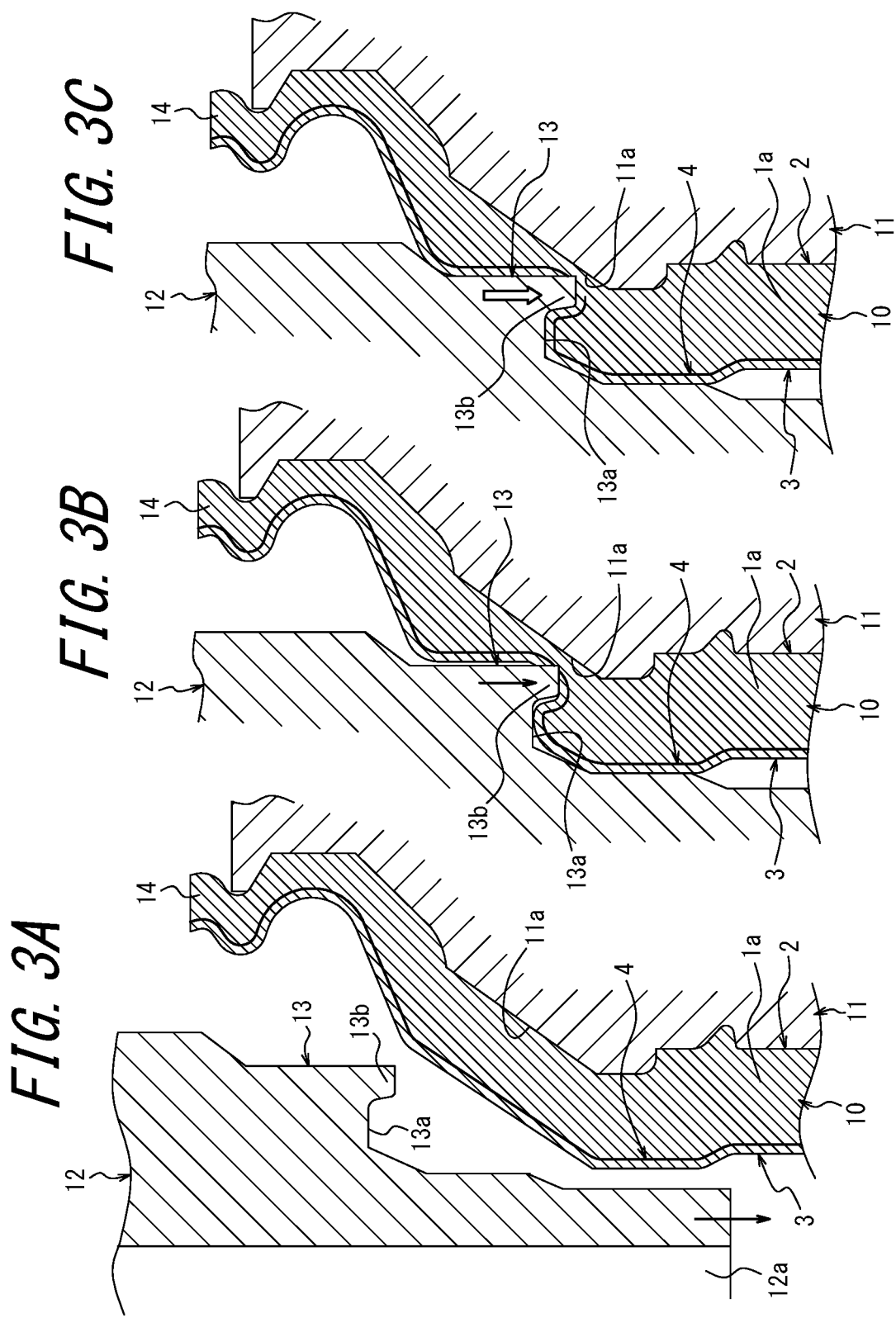

DELAMINATION CONTAINER

TECHNICAL FIELD

The present disclosure relates to a delamination container formed in a shape including a tubular mouth and a trunk contiguous with the mouth.

BACKGROUND

As a container for containing cosmetics such as face lotion, shampoo, rinse, liquid soap, food seasoning, or the like, a peelable laminated container, which is also called delamination container, has been used.

Known examples of such a delamination container may include the one that is formed in a shape (e.g., a bottle shape) including a mouth and a trunk contiguous with the mouth and that has a three-layer structure including an outer layer body and an inner layer body, which are formed of resin materials such as polypropylene (PP), polyethylene (PE), polyethylene terephthalate (PET), and modified polyolefin, and an intermediate layer, which is formed of nylon or ethylene vinyl alcohol copolymer resin and disposed between the outer layer body and the inner layer body so that the inner layer is peelable from the outer layer.

When the trunk of the outer layer body is pressed (squeezed), the delamination container may dispense content liquid contained inside the inner layer body to the outside. Once the pressure is released, ambient air is introduced between the outer layer body and the inner layer body through an ambient air inlet hole provided in the outer layer body, and the outer layer body is restored to the original shape while the volume of the inner layer body remains reduced. With the above configuration, the delamination container may dispense the content liquid without replacing the content liquid with ambient air. Accordingly, contact between the content liquid remaining in the container and air is prevented, and the content liquid is prevented from undergoing deterioration and a change in quality.

Conventionally, the delamination container is formed in a predetermined shape by preparing a tubular-shaped laminated parison by co-extruding three-layered resin materials corresponding to the outer layer body, the inner layer body, and the intermediate layer, by closing one end of the prepared laminated parison by pinching off the one end with a mold, and by direct-blow molding the laminated parison by supplying air into the laminated parison via a plug inserted through another end of the laminated parison in the above state.

However, in the delamination container configured as above, an end portion of the intermediate layer is exposed to the outside at an opening end of the mouth after molding. This poses the risk of peeling of the inner layer body starting from the end portion of the intermediate layer at the opening end of the mouth.

As a technology to prevent the peeling of the inner layer body from the opening end of the mouth, as described, for example, in Patent Literatures 1 and 2, the delamination container is also known to be configured as follows. That is to say, the delamination container may include the inner layer body, whose upper end is shaped to be bent outward, and an upper end portion of the inner layer body is sandwiched between a packing of a pump-mounted cap fitted to the mouth and an upper end of the outer layer body to prevent the inner layer body from peeling from the outer layer body at the opening end of the mouth.

CITATION LIST

Patent Literatures

PTL1: JPH08133322A
PTL2: JPH08156078A

SUMMARY

Technical Problems

Nevertheless, even with the aforementioned conventional configuration of the delamination container, the inner layer body might peel from the opening end of the mouth when the pump-mounted cap is not fitted to the mouth, for example, during distribution.

Furthermore, the configuration in which the intermediate layer is exposed to the outside also poses the problem that barrier properties of the intermediate layer may be decreased due to the influence of water vapor or the like.

The present disclosure is to solve the above problems, and the present disclosure is to provide a delamination container that ensures that the inner layer body is prevented from peeling from the opening end of the mouth.

Solution to Problems

One of aspects of the present disclosure resides in a delamination container formed in a shape including a tubular mouth and a trunk contiguous with the mouth. The delamination container includes: an outer layer body formed of a resin material; an inner layer body that is formed of a resin material and that is disposed on an inner side of the outer layer body in a manner such that the inner layer body is peelable from the outer layer body; and an intermediate layer that is formed of a resin material different from the resin materials forming the outer layer body and the inner layer body and that is disposed between the outer layer body and the inner layer body. The outer layer body, the inner layer body, and the intermediate layer are formed by direct-blow molding a laminated parison including resin layers corresponding to the outer layer body, the inner layer body, and the intermediate layer, and at an opening end of the mouth, an end portion of the intermediate layer is covered by the outer layer body and the inner layer body.

In a preferred embodiment of the delamination container, the mouth is integrally provided, on an outer circumferential surface thereof, with an annular ring-shaped moil cut portion including a downwardly extending tapered surface inclined with respect to an axis direction of the mouth, and in the mouth, the end portion of the intermediate layer is bent to an outer side in a radial direction toward the moil cut portion.

Advantageous Effect

According to the present disclosure, at the opening end of the mouth, the end portion of the intermediate layer from which the peeling may start is covered by the outer layer body and the inner layer body. This ensures that the inner layer body is prevented from peeling from the outer layer body at the opening end of the mouth.

BRIEF DESCRIPTION OF THE DRAWINGS

In the accompanying drawings:

FIG. 1 is a sectional view illustrating a delamination container according to one of embodiments of the present disclosure;

FIG. 2 is an enlarged sectional view illustrating a part of an opening end of a mouth of a delamination container illustrated in FIG. 1; and FIGS. 3A, 3B and 3C are enlarged sectional views illustrating a procedure of molding a mouth of a parison at the time of direct-blow molding a delamination container illustrated in FIG. 1.

DETAILED DESCRIPTION

The present disclosure will be described in more detail below by illustration with reference to the drawings.

A peelable laminated container 1 in FIG. 1 according to one of embodiments of the present disclosure is also called delamination container, and the delamination container 1 is formed in a bottle shape including a mouth 1a, which has a tubular shape with a circular section, and a trunk 1b, which is contiguous with and below the mouth 1a. The trunk 1b has squeeze properties that allow the trunk 1b to be dented when being pressed (squeezed) and to be restored to the original shape from the dented state.

The delamination container 1 has a three-layer structure including an outer layer body 2, an inner layer body 3, and an intermediate layer 4.

The outer layer body 2 constitutes an outer shell of the delamination container 1 and may be formed of a resin material, such as polyethylene terephthalate (PET), polyethylene (PE), and polypropylene (PP).

The inner layer body 3 may be formed of the same resin material as the outer layer body 2 in a bag shape having a thickness smaller than the outer layer body 2, and the inner layer body 3 is disposed on the inner side of the outer layer body 2 in a manner such that the inner layer body 3 is peelable from the outer layer body 2. The inner layer body 3 has, in an upper end thereof, an opening which is connected to the opening end of the mouth 1a, and also has, inside thereof, a container portion 3a. The container portion 3a may contain content liquid, including cosmetics such as face lotion, shampoo, rinse, liquid soap, or food seasoning.

Forming the thickness of the inner layer body 3 smaller than the thickness of the outer layer body 2 as described above allows the inner layer body 3 to undergo volume reduction and deformation suitably in accordance with dispensing of the content liquid while allowing the outer layer body 2 to maintain the squeeze properties of the trunk 1b, that is to say, the capability of the trunk 1b to be deformed in response to pressure and restored from the deformation, even when the outer layer body 2 and the inner layer body 3 are formed of the same resin material. Additionally, the inner layer body 3 may be formed of a resin material, such as modified polyolefin, that is different from the resin material forming the outer layer body 2.

The intermediate layer 4 is formed of a resin material of a kind different from the resin material forming the outer layer 2 and the inner layer body 3 in a thickness smaller than the outer layer body 2 and the inner layer body 3. The intermediate layer 4 is disposed between the outer layer body 2 and the inner layer body 3. Since the inner layer body 3 is formed to be thinner than the outer layer body 2, the intermediate layer 4 is disposed at a position between the outer layer body 2 and the inner layer body 3 that is biased to the inner side relative to a middle position in the thickness direction of the delamination container 1.

The intermediate layer 4 may be formed of a resin material, such as nylon and ethylene vinyl alcohol (EVOH) copolymer resin, that has low adhesive properties to at least one of the resin material forming the outer layer body 2 and the resin material forming the inner layer body 3. By disposing the above intermediate layer 4 between the outer layer body 2 and the inner layer body 3, the inner layer body 3 is configured to be peelable from the outer layer body 2 regardless of whether the resin material forming the outer layer body 2 and the resin material forming the inner layer body 3 are of the same kind or different kinds.

Furthermore, when nylon or ethylene vinyl alcohol copolymer resin is used as the resin material forming the intermediate layer 4, gas barrier properties of the delamination container 1 are improved.

When the outer layer body 2 and the inner layer body 3 are formed of the same kind of resin materials, a part of the intermediate layer 4, for example, in the trunk 1b, may be cut out to provide an adhered portion (which is not illustrated) in which the outer layer body 2 and the inner layer body 3, which are formed of the same kind of resin materials, are adhered to each other. By providing an appropriate number of such adhered portions in suitable positions, the remaining amount of the content liquid may be reduced by causing the container portion 3a to undergo volume reduction and deformation stably, with a part of the inner layer body 3 being supported by the outer layer body 2. Additionally, the shape of each adhered portion may be any of a variety of shapes, such as a strip shape extending along the axis direction of the trunk 1b, and the positions and numbers of the adhered portions may be set freely. When, for example, the outer layer body 2 and the inner layer body 3 are formed of different kinds of resin materials and when the inner layer body 3 has adhesive properties to the intermediate layer 4, a strip-shaped adhered layer may be provided, for example, between the outer layer body 2 and the intermediate layer 4. By doing so, the same effect as described above is achieved.

For an instance, the delamination container 1, which has the aforementioned layer structure, may have a three-layer structure including the outer layer 2, which is formed of low density polyethylene (LDPE), the intermediate layer 4, which is formed of ethylene vinyl alcohol (EVOH) copolymer resin, and the inner layer body 3, which is formed of modified polyolefin.

Although not illustrated, the delamination container 1 is provided, in the mouth 1a, with an ambient air inlet hole that extends through the outer layer body 2 in the inner-outer direction along the radial direction of the mouth 1a and that communicates between the outer layer body 2 and the intermediate layer 4. Additionally, the ambient air inlet hole does not necessarily need to be provided in the mouth 1a and may be provided in any other portions, such as the trunk 1b and a bottom thereof.

To the mouth 1a of the delamination container 1, a dispensing cap (which is not illustrated) including a dispensing tube provided with a check valve is fitted. Via the dispensing cap, the content liquid contained in the container portion 3a of the inner layer body 3 is dispensed to the outside. With the check valve, the dispensing cap serves to prevent air from flowing into the container portion 3a of the inner layer body 3 through the dispensing tube after the content liquid is dispensed. Additionally, the dispensing cap may be screw-connected to a screw portion 1c, which is provided in the mouth 1a, to be fixed to the mouth 1a. However, the dispensing cap may also be fixed to the mouth 1a by any other means such as an undercut.

Suppose that the dispensing cap, which includes the dispensing tube provided with the check valve, is fitted to the mouth 1a of the delamination container 1. Then, when the trunk 1b is pressed (squeezed), the delamination container 1 may dispense the content liquid contained in the container portion 3a of the inner layer body 3 to the outside through the mouth 1a. After the content liquid is dispensed, once the pressure to the trunk 1b is released, the outer layer body 2 is restored to the original shape. At this time, ambient air is introduced between the outer layer body 2 and the inner layer body 4 through the ambient air inlet hole, and the outer layer body 2 is restored to the original shape while the volume of the container portion 3a of the inner layer body 3 remains reduced. Accordingly, even when the content liquid is dispensed, ambient air is prevented from flowing into the container portion 3a of the inner layer body 3 through the mouth 1a. This prevents the content liquid from undergoing deterioration and a change in quality due to contact with air.

As illustrated in FIG. 2, in the delamination container 1, an end portion of the intermediate layer 4 is covered by the outer layer body 2 and the inner layer body 3 at the opening end of the mouth 1a and accordingly, prevented from being exposed to the outside. That is to say, at the opening end of the mouth 1a, the intermediate layer 4 is embedded in the resin material forming the outer layer body 2 and the resin material forming the inner layer body 3.

In more detail, at the opening end of the mouth 1a, the inner layer body 3 is bent to the outer side in the radial direction to form an upper end surface 5 of the mouth 1a. Furthermore, in an outer circumferential side portion of the upper end surface 5 of the mouth 1a, an annular-shaped stepped recess 6 is provided. On an outer circumferential surface of the mouth 1a, a moil cut portion 7 is also provided integrally. The moil cut portion 7 is formed to have a triangular section which has an upper end formed flat to be contiguous and flush with the stepped recess 6 and a downwardly extending surface formed as a downwardly extending tapered surface 7a, which is inclined with respect to the axis direction of the mouth 1a. The moil cut portion 7 is also formed in an annular ring shape extending around the entire circumference of the mouth 1a.

The downwardly extending tapered surface 7a of the moil cut portion 7 is preferably inclined at an angle of from 30 degrees to 50 degrees with respect to the axis direction of the mouth 1a. In the present embodiment, the downwardly extending tapered surface 7a is inclined at an angle of 35 degrees with respect to the axis direction of the mouth 1a. Furthermore, the flat surface of the stepped recess 6, which is contiguous with the upper end of the moil cut portion 7, is preferably positioned 0.15 mm or more away from and above (i.e., toward the opening end of the mouth 1a) a border portion between the outer circumferential surface of the mouth 1a and the downwardly extending tapered surface 7a in the axis direction. In the illustrated example, the flat surface of the stepped recess 6 is positioned 0.3 mm above the border portion between the outer circumferential surface of the mouth 1a and the downwardly extending tapered surface 7a in the axis direction.

At the opening end of the mouth 1a, the intermediate layer 4, together with the inner layer body 3, is bent toward the moil cut portion 7, that is to say, to the outer side in the radial direction. The end portion of the intermediate layer 4 is disposed on the inner side in the radial direction of the moil cut portion 7 and covered by the outer layer body 2 and the inner layer body 3.

Thus, in the delamination container 1 according to the present disclosure, the end portion of the intermediate layer 4, which is disposed between the outer layer body 2 and the inner layer body 3, is covered by the outer layer body 2 and the inner layer body 3 at the opening end of the mouth 1a to prevent the exposure to the outside. Accordingly, the opening end of the mouth 1a is formed as an integrated surface by the resin material forming the outer layer body 2 and the resin material forming the inner layer body 3, and the end portion of the intermediate layer 4 from which the peeling may start is prevented from being exposed to the outside at the opening end of the mouth 1a. This ensures the prevention of peeling of the inner layer body 3 from the outer layer body 2 that starts from the end portion of the intermediate layer 4 at the opening end of the mouth 1a.

Moreover, in the delamination container 1 according to the present disclosure, the intermediate layer 4, which is covered by the outer layer body 2 and the inner layer body 3 at the opening end of the mouth 1a, is prevented from being exposed to the outside. Accordingly, even when the intermediate layer 4 is formed of barrier resin, such as nylon and ethylene vinyl alcohol copolymer resin, the intermediate layer 4 is protected against the influence of water vapor or the like, and a decrease in barrier properties thereof is prevented.

As illustrated in FIG. 3, the delamination container 1 with the above configuration is formed by direct-blow molding (extrusion-blow molding) a laminated parison 10, which is formed to have the three-layer structure including a resin layer to form the outer layer body 2, a resin layer to form the inner layer body 3, and a resin layer to form the intermediate layer 4.

Additionally, in FIG. 3, the layers included in the laminated parison 10 are denoted by the same reference numerals as the outer layer body 2, the inner layer body 3, and the intermediate layer 4 correspondingly for the sake of convenience.

In this example, the laminated parison 10, which has the three-layer structure, is disposed in a blow molding mold 11. Then, a lower end of the laminated parison 10 is pinched off by the mold 11 to be closed, and a plug 12 is inserted to an upper end of the laminated parison 10. By supplying pressurized air into the laminated parison 10 via a supply hole 12a, which is provided in the axis of the plug 12, the laminated parison 10 is molded into a predetermined shape conforming to the blow molding mold 11.

Additionally, at the time of direct blow molding, with use of a collar portion 13, which is provided integrally in an outer circumferential portion of the plug 12, a mouth portion of the laminated parison 10, which is to be molded into the predetermined shape with the blow molding mold 11, is molded into a predetermined shape corresponding to the mouth 1a of the delamination container 1 after molding.

As illustrated in FIG. 3A, the collar portion 13 includes a flat annular ring-shaped molding surface 13a, which extends perpendicularly to the axis direction of the plug 12, and an annular-shaped cutting projection 13b, which projects toward the axis direction (downward) from the molding surface 13a and which has a rectangular section. On the other hand, the blow molding mold 11 includes, on the upper side of a portion thereof that is to mold an outer circumferential surface of the mouth portion of the laminated parison 10, a tapered portion 11a, which is inclined with respect to the axis direction of the laminated parison 10 and the plug 12. The tapered portion 11a is preferably inclined at an angle of from 30 degrees to 50 degrees with respect to the axis direction of the laminated parison 10 and the plug 12. In the present embodiment, the tapered portion 11a is inclined at an angle of 35 degrees with respect to the axis direction of the laminated parison 10 and the plug 12.

At the time of direct blow molding, as illustrated in FIG. 3B, the plug 12 is lowered at the first lowering rate to be inserted into the mouth portion of the laminated parison 10 from above in the state where the laminated parison 10 is disposed in the mold 11. Accordingly, the outer circumferential surface of the plug 12 serves to mold the inner circumferential surface of the mouth portion of the laminated parison 10, and the collar portion 13 serves to mold the upper end surface 5 of the mouth portion while pinching off the laminated parison 10 at a predetermined position. At this time, since the laminated parison 10 is disposed along the tapered portion 11a and pressed downward by the molding surface 13a from above, the intermediate layer 4, together with the inner layer body 3, is bent to the outer side in the radial direction and slightly cut by the cutting projection 13b.

Then, as illustrated in FIG. 3C, when the plug 12 is lowered to a predetermined position before pinching off the laminated parison 10, the lowering rate of the plug 12 is increased to the second lowering rate that is greater than the first lowering rate. Once the cutting projection 13b abuts against the outer circumferential surface of the tapered portion 11a of the mold 11 in the state where the plug 12 is lowered at the second lowering rate, a moil 14, which is a part of the laminated parison 10 located on the upper side of another part of the laminated parison 10 that is to be molded into the mouth 1a, is pinched off. As a result of the above moil cutting operation, the moil 14, which is the part of the laminated parison 10 located on the upper side of the other part of the laminated parison 10 that is to form the mouth 1a, is cut and removed. Additionally, the moil cutting operation of the laminated parison 10 is performed preferably at a position 0.15 mm or more away from and above a lower end of the tapered portion 11a of the mold 11. In the present embodiment, the moil cutting operation of the laminated parison 10 is performed at a position 0.3 mm away from and above the lower end of the tapered portion 11a of the mold 11.

In the above moil cutting operation, by the plug 12 being accelerated to the second lowering rate, a peripheral portion of the part of the laminated parison 10 that is subjected to the moil cutting operation is depressed to the oblique inner side along inclination of the tapered portion 11a by the cutting projection 13b and accordingly, compressed by the depression. Consequently, the intermediate layer 4 is significantly divided in the cutting portion, and the outer layer body 2 and the inner layer body 3 are squeezed to the outside of the cut end portion of the intermediate layer 4. Thus, at the mouth 1a after molding, the end portion of the molded intermediate layer 4 is covered by the outer layer body 2 and the inner layer body 3 and embedded in the opening end of the mouth 1a. Furthermore, as a result of the moil cutting operation using the cutting projection 13b, which is provided in the plug 12, and the tapered portion 11a of the mold 11, the moil cut portion 7, which includes the downwardly extending tapered surface 7a inclined with respect to the axis direction of the mouth 1a, is formed on the outer circumferential surface of the mouth 1a of the delamination container 1 resulting from molding.

By thus conducting the molding and the moil cutting operation of the mouth of the laminated parison 10 by using the tapered portion 11a, which is provided in the mold 11, and the cutting projection 13b, which is provided in the plug 12, while increasing the lowering rate of the plug 12 halfway, the intermediate layer 4 is easily formed to be covered by the outer layer body 2 and the inner layer body 3 at the mouth 1a of the delamination container 1 resulting from molding.

Needless to say, the present disclosure is not limited to the above embodiment, and various changes may be made without departing the gist of the present disclosure.

For example, although in the above embodiment the outer layer body 2 and the inner layer body 3 are formed of the same kind of resin materials, the present disclosure is not limited to the above embodiment. The outer layer body 2 and the inner layer body 3 may be formed of different kinds of resin materials, which have high adhesive properties to each other.

Furthermore, although in the above embodiment the delamination container 1 has the three-layer structure including the outer layer body 2, the inner layer body 3, and the intermediate layer 4, which is disposed therebetween, the present disclosure is not limited to the above embodiment. The delamination container 1 only has to have at least the above three layers and may have a multi-layer structure including 3 or more layers. Examples of the multi-layer structure may include a four-layer structure including an adhered layer disposed between the inner layer body 3 and the intermediate layer 4, a four-layer structure including a strip-shaped adhered layer disposed between the outer layer body 2 and the intermediate layer 4, a five-layer structure including a pair of intermediate layers 4, which is disposed between the outer layer body 2 and the inner layer body 3, and also including an additional layer disposed between the pair of intermediate layers 4. As such a multi-layer structure, for example, a four-layer structure including the outer layer body 2, which is formed of low-density polyethylene (LDPE), the intermediate layer 4, which is formed of ethylene vinyl alcohol (EVOH) copolymer resin, the inner layer body 3, which is formed of modified polyolefin, and low-density polyethylene (LDPE) disposed on the further inner side of the inner layer body 3 may be considered.

Moreover, although in the above embodiment the laminated parison 10 is subjected to the moil cutting operation using the cutting projection 13b, which is provided in the collar portion 13, at the time of direct blow molding, the present disclosure is not limited to the above embodiment. At the time of direct blow molding, the moil 14 does not necessarily need to be pinched off from the laminated parison 10 completely, and a small thickness of the moil 14 may be left in connection with the laminated parison 10. Then, in the subsequent (after-blow finishing) step, the moil 14 may be cut and removed.

Moreover, although in the above embodiment, by conducting the molding and the moil cutting operation of the mouth of the laminated parison 10 by using the tapered portion 11a, which is provided in the mold 11, and the cutting projection 13b, which is provided in the plug 12, while increasing the lowering rate of the plug 12 halfway, the intermediate layer 4 is formed to be covered by the outer layer body 2 and the inner layer body 3 at the mouth 1a of the delamination container 1 resulting from molding, the present disclosure is not limited to the above embodiment. The delamination container 1 may be molded by any other molding method, by which the intermediate layer 4 is formed to be covered by the outer layer body 2 and the inner layer body 3 at the opening end of the mouth 1a.

Moreover, in the above embodiment, the ambient air inlet hole is provided only in the outer layer body 2, and the inner layer body 3, together with the intermediate layer 4, is peeled from the outer layer body 2. However, the ambient air inlet hole may be provided to reach from the outer layer body 2 through to the intermediate layer 4, and only the inner layer body 3 may be peeled from the outer layer body 2, with the intermediate layer 4 remaining on the side of the outer layer body 2.

REFERENCE SIGNS LIST

1 Delamination container
1*a* Mouth
1*b* Trunk
1*c* Screw portion
2 Outer layer body
3 Inner layer body
3*a* Container portion
4 Intermediate layer
5 Upper end surface
6 Stepped recess
7 Moil cut portion
7*a* Downwardly extending tapered surface
10 Laminated parison
11 Mold
11*a* Tapered portion
12 Plug
12*a* Supply hole
13 Collar portion
13*a* Molding surface
13*b* Cutting projection
14 Moil

The invention claimed is:

1. A delamination container formed in a shape including a tubular mouth and a trunk contiguous with the mouth, the delamination container comprising:
   an outer layer body formed of a resin material;
   an inner layer body that is formed of a resin material and that is disposed on an inner side of the outer layer body in a manner such that the inner layer body is peelable from the outer layer body; and
   an intermediate layer that is formed of a resin material different from the resin materials forming the outer layer body and the inner layer body and that is disposed between the outer layer body and the inner layer body, wherein:
   the mouth is integrally provided, on an outer circumferential surface thereof, with an annular ring-shaped portion including a downwardly extending tapered surface inclined with respect to an axis direction of the mouth, and
   at an opening end of the mouth, an end portion of the intermediate layer is bent to an outer side of the annular ring-shaped portion in a radial direction and is covered by the outer layer body and the inner layer body, and an end surface of the intermediate layer is directed to the outer side of the annular ring-shaped portion in the radial direction.

2. The delamination container of claim 1, wherein:
   the outer layer body, the inner layer body, and the intermediate layer are formed by direct-blow molding a laminated parison including resin layers corresponding to the outer layer body, the inner layer body, and the intermediate layer, and the annular ring-shaped portion is a moil cut portion.

3. The delamination container of claim 1, wherein in the mouth, the end portion of the intermediate layer body is disposed on an inner side of the annular ring-shaped portion in the radial direction.

4. The delamination container of claim 1, wherein the intermediate layer has low adhesive properties to at least one of a resin material forming the inner layer body and a resin layer forming the outer layer body.

5. The delamination container of claim 4, wherein the resin material is nylon or an ethylene vinyl alcohol copolymer resin.

6. The delamination container of claim 1, further comprising:
   an adhesive layer that is disposed between the intermediate layer and either the inner layer body or the outer layer body.

* * * * *